United States Patent [19]
Mehren et al.

[11] 4,301,739
[45] Nov. 24, 1981

[54] VEHICLE ADAPTED TO BE EXTERNALLY MECHANICALLY GUIDED, ESPECIALLY FOR THE PUBLIC LOCAL PASSENGER TRAFFIC

[75] Inventors: Herbert Mehren, Ludwigsburg; Dieter Braun, Weinstadt, both of Fed. Rep. of Germany

[73] Assignee: Daimler-Benz Aktiengesellschaft, Stuttgart, Fed. Rep. of Germany

[21] Appl. No.: 32,016

[22] Filed: Apr. 20, 1979

[30] Foreign Application Priority Data

Apr. 28, 1978 [DE] Fed. Rep. of Germany ....... 2818754

[51] Int. Cl.³ .............................................. B61F 9/00
[52] U.S. Cl. .................................... 104/247; 104/119; 105/144; 180/79.1; 180/131; 280/776
[58] Field of Search ............... 104/118, 119, 130, 242, 104/244.1, 245, 247; 180/79, 131, 79.1, 141, 142, 146; 280/89, 776; 105/141, 144; 74/473 SW

[56] References Cited

U.S. PATENT DOCUMENTS

| 2,299,199 | 10/1942 | Wood | 180/79.1 X |
| 2,311,321 | 2/1943 | Zigan | 180/79.1 |
| 2,453,949 | 11/1948 | Ulinski | 180/79.1 |
| 3,393,762 | 7/1968 | Matson | 180/137 X |
| 3,636,794 | 1/1972 | Van Wicklin, Jr. | 180/146 X |
| 3,643,601 | 2/1972 | Taylor et al. | 105/144 X |
| 3,651,885 | 3/1972 | Lang | 180/142 |
| 3,796,165 | 3/1974 | Goode | 105/168 X |

FOREIGN PATENT DOCUMENTS

| 2242009 | 3/1975 | France | 180/79.1 |
| 1435968 | 5/1976 | United Kingdom | 180/142 |

Primary Examiner—Randolph A. Reese
Attorney, Agent, or Firm—Craig and Antonelli

[57] ABSTRACT

A vehicle adapted to be externally guided mechanically along guide tracks, especially for public local passenger service, which includes a steerable vehicle axle provided with steerable wheels and with maximally bending resistance supporting arms arranged at wheel hubs of the steerable wheels and extending unilaterally forwardly in the driving direction of the vehicle. A transverse guide arrangement is disposed at the forward ends of the supporting arms so as to provide for an automatic track-side influencing of the turning angle of the steerable wheels. A motor is fixedly mounted in a zone of a hub of a steering wheel so as to be capable of operatively acting upon the steering wheel. The motor, when an output part thereof is at a quasi-stand still, is capable of exerting a torque on the steering wheel which torque can be freely selected in its effective direction.

24 Claims, 4 Drawing Figures

VEHICLE ADAPTED TO BE EXTERNALLY MECHANICALLY GUIDED, ESPECIALLY FOR THE PUBLIC LOCAL PASSENGER TRAFFIC

The present invention relates to a vehicle and, more particularly, to a public local passenger service vehicle adapted to be mechanically externally guided along tracks or guide rails.

In German patent application Pat. No. 27 46 462.6 which corresponds to U.S. application Ser. No. 951,044, a vehicle of the aforementioned type is proposed wherein the vehicle includes a steerable vehicle axle provided with rotatable wheels and with maximally bending resistant supporting arms arranged at the wheel hubs of the turnable wheels on both sides of the vehicle with the supporting arms extending unilaterally forwardly in a driving direction of the vehicle. A transverse guide roller is arranged at a front end of the supporting arms with the guide roller being located in front of the corresponding turnable wheel as viewed in the driving direction and held in fixed correlation with the wheel play for an automatic track-side influencing of the turning angle of the steering wheels. A steering linkage for the turnable wheels and the supporting arms can be biased arbitrarily in a direction toward one of the two vehicle sides.

In vehicles which can be transversely guided, with supporting arms arranged unilaterally in a driving direction in front of turnable wheels and carrying transverse guide rollers, the force for the transverse guidance of the vehicle is provided by the vehicle wheels proper and the supporting arms and transverse guide rollers are merely stressed by the steering forces. The transverse guidance of such a vehicle constitutes a control process wherein, in proportion to the relative approach of the vehicle toward one of the transverse guide bars of the track or guide rail, the steering angle of the turnable wheels is corrected in such a way that a lateral distance of the vehicle from the transverse guide bar is again directed toward the corresponding normal measure.

By virtue of an arrangement such as proposed in the aforementioned German patent application and copending United States application, a guiding characteristic of the overall system is the better the more rigid the mounting of the transverse guide roller and the transverse guide roller proper.

In case of a unilateral rigging of the steering linkage toward one of the sides of the vehicle, such a vehicle can also be guided securely along only a single lateral transverse guide bar. This is advantageous in, for example, the zone of switches or branches in the tracks or guide rail wherein, in case of a so-called passive switch without moveable guide elements, there is merely one continuous transverse guide bar arranged on an outside of the switch or branch area.

The aim underlying the present invention essentially resides in providing a vehicle of the aforementioned type which incorporates a suitable construction for a unilateral pretensioning of the transverse guide rollers.

In accordance with advantageous features of the present invention, a motor is fixedly mounted in a zone of the hub of a steering wheel of the vehicle with the motor being adapted to act upon the steering wheel. When an output part of the motor is at a quasi standstill, the motor is capable of exerting a torque on the steering wheel which torque can be freely selected in its effective direction.

By virtue of the above-noted features of the present invention, a certain moment is exerted by a motor on the steering wheel and/or the steering shaft connected therewith. The motor providing a torsional moment can be fashioned as an electric torque motor of a conventional type which can readily provide a defined torque during a standstill.

Alternatively, it is also possible in accordance with the present invention to provide a conventional electric motor which acts on the steering shaft by way of a slip clutch and a gear system with the slip clutch being advantageously fashioned as a hydrodynamic clutch. Since the required moment to which the steering wheel must be exposed can depend on the degree of turning of the steerable wheels themselves, the steering wheel and/or the steering linkage may be coupled with a pivotal position or rotary position indicator or pickup means. To set a specific contact force dynamometers can be respectively arranged in the mounting of the transverse guide rollers.

According to the present invention, the motor may be an electric torque motor which is arranged concentrically to the steering wheel or it is also possible to utilize a conventional electric motor arranged eccentrically to an axis of the steering wheel with the motor acting on the shaft of the steering wheel by way of the above-noted slip clutch and gear mechanism bridging the eccentricity.

The gear mechanism in accordance with the present invention may be fashioned as a belt-drive mechanism especially as a gear belt drive mechanism and the pivotal position or rotary position indicator coupled to the steering linkage or steering wheel may be fashioned as a rotary potentiometer.

Accordingly, it is an object of the present invention to provide an externally mechanically track-guided vehicle, especially for local public passenger traffic, which avoids, by simple means, shortcomings and disadvantages encountered in the prior art.

Another object of the present invention resides in providing an externally mechanically track-guided vehicle by which a suitable unilateral pretensioning of the transverse guide rollers is obtained.

A further object of the present invention resides in providing an externally mechanically track-guided vehicle which enables a secure guiding along only a single lateral transverse guide bar.

A still further object of the present invention resides in providing an externally mechanically track-guided vehicle by which a constant pretensioning moment is applied to a steering mechanism of the vehicle.

Yet another object of the present invention resides in providing an externally mechanically track-guided vehicle which insures the existence of a certain minimum contact force for transverse guide means of the vehicle.

Yet another object of the present invention resides in providing an externally mechanically track-guided vehicle which is simple in construction and therefore relatively inexpensive to manufacture.

A further object of the present invention resides in providing an externally mechanically track-guided vehicle which functions reliably under all operating conditions.

These and other objects, features, and advantages of the present invention will become more apparent from the following description when taken in connection with the accompanying drawings which show, for the purposes of illustration only, two embodiments in accordance with the present invention and wherein.

Figure 1:
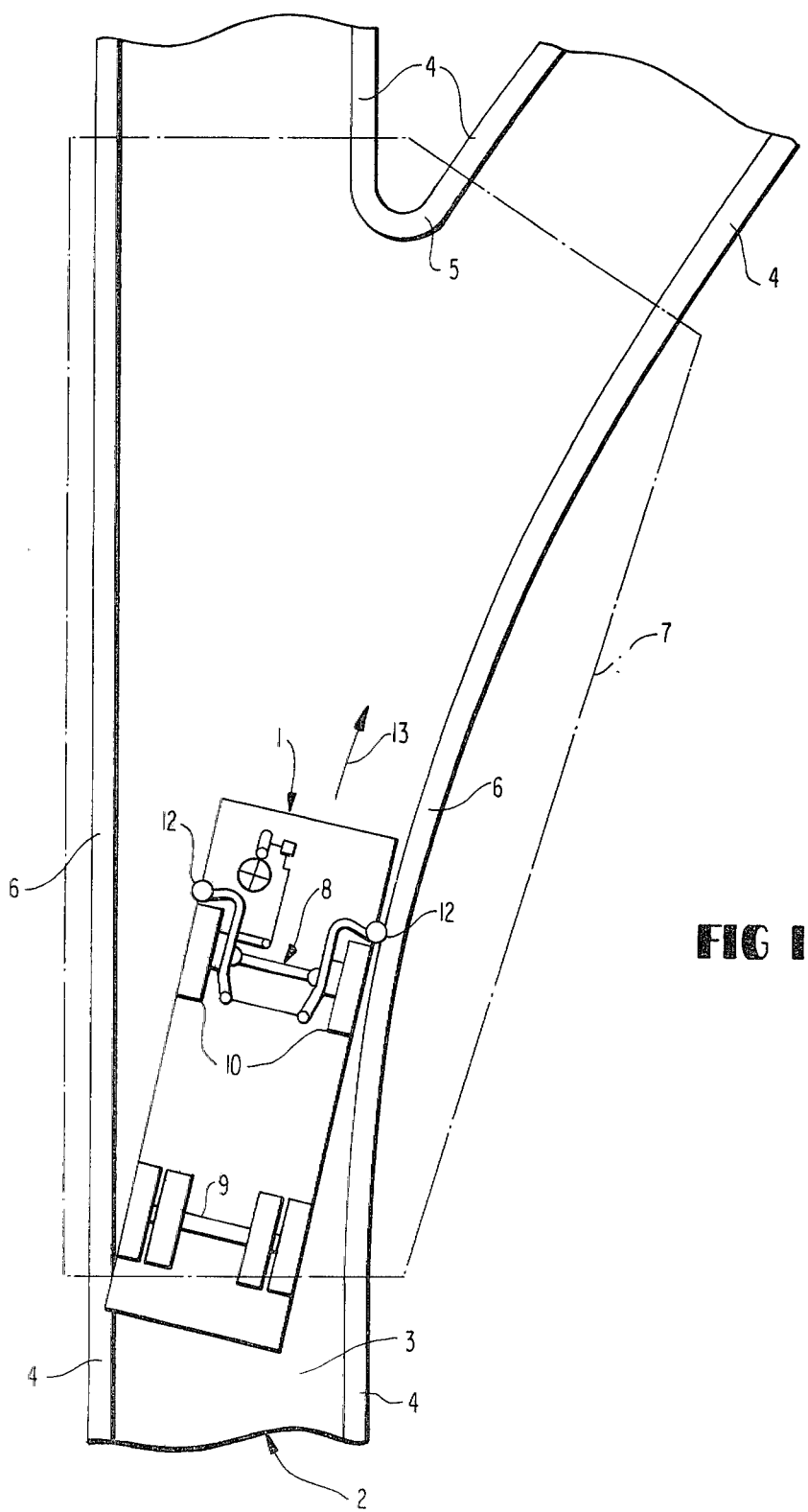
FIG. 1 is a top view of a junction of a vehicle guide track with a vehicle in accordance with the present invention being located at a branch-off point.

Referring now to the drawings wherein like reference numerals are used throughout the various views to designate like parts and, more particularly, to FIG. 1, according to this Figure, guide track generally designated by the reference numeral 2 is provided which include wheel runways 3 and transverse guide bars or flanges 4 arranged in a zone or area of a normal drive path of a vehicle generally designated by the reference numeral 1. Within a switching zone 7, illustrated by dot-dash line, transverse guide bars are arranged continuously only along the outsides of the tracks 2 with transverse guide bars 5 being arranged on an inside of the switch zone 7 and extending in an interrupted fashion. The switch proper is not provided with movable switching or guide elements and, consequently, it is constructed as a passive switch. In order to insure a reliable operation of the vehicles 1 travelling thereon, appropriate guide elements must be provided on board the vehicles 1.

The vehicle travelling along a traffic system utilizing guide tracks 2 includes a steerable vehicle axle generally designated by the reference numeral 8 having mounted thereon turnable wheels and a non-steerable vehicle axle 9. Supporting arms 11 extending toward the front of the vehicle 1 in the travelling direction are mounted unilaterally in the zone of the turnable or steerable wheels 10 with the arms 11 participating in a turning movement of the wheels 10.

The supporting arms 11 are provided with bent ends at which are mounted transverse guide rollers 12 which project somewhat laterally beyond the lateral contour of the vehicle 1. The transverse guide rollers 12 are held in fixed association with the plane of the respective wheels 10. Although the transverse guide rollers 12, disposed forwardly of the wheels 10, as viewed in the travelling direction of the vehicle 1, are stressed in this unilateral arrangement of transverse guide rollers 12 merely by the steering forces rather than also by transverse guiding forces, the mounting of the transverse guide rollers 12 is constructed so as to be maximally inflexible so that high transverse-travelling convenience in guidance of the vehicle 1 true to the track 2 will result along the transverse guide bars 4, 6, respectively.

In case of a unilateral pretensioning of the stering linkage of the vehicle 1 in a direction toward the only unilaterally provided transverse guide bars 4, 6, respectively, such a vehicle 1 can also be guided securely along only a single transverse guide bar. In case of track junctions, with the running track 2 extending a curved shape through a region of the switch, a continuous transverse guide bar 6 is present only on the inside of the curve. Also, cases are possible wherein a unilateral transverse guidance of the vehicle I through curves must take place with a transverse guide bar provided only on the outside of the curve. Such guidance of the vehicles on the outside of the curve is applicable in connection with relatively sharp curves with, for example, a curve radius of below 60 meters because such sharp curves can be traversed only with larger lateral displacement of the nonsteerable rear vehicle axle 9 on the inside of the curve as compared with the forward steerable vehicle axle 8. In cases of sharp curves, the lateral displacement is larger than the distance by which the transverse guide rollers 12 project beyond the profile of the vehicle 1.

Figure 2:
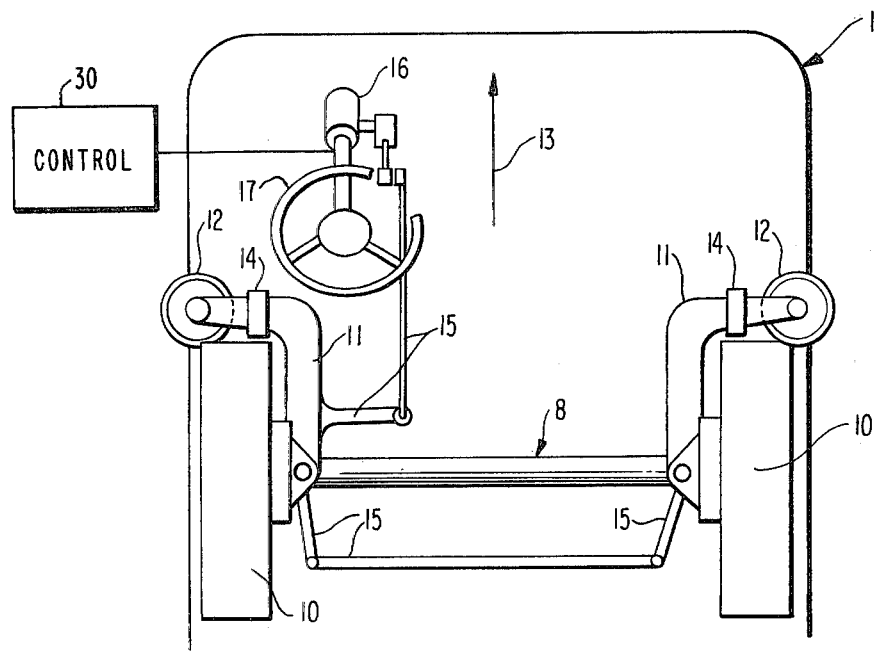
FIG. 2 is a partially schematic top view of a front portion of a vehicle in accordance with the present invention.
Figure 3:
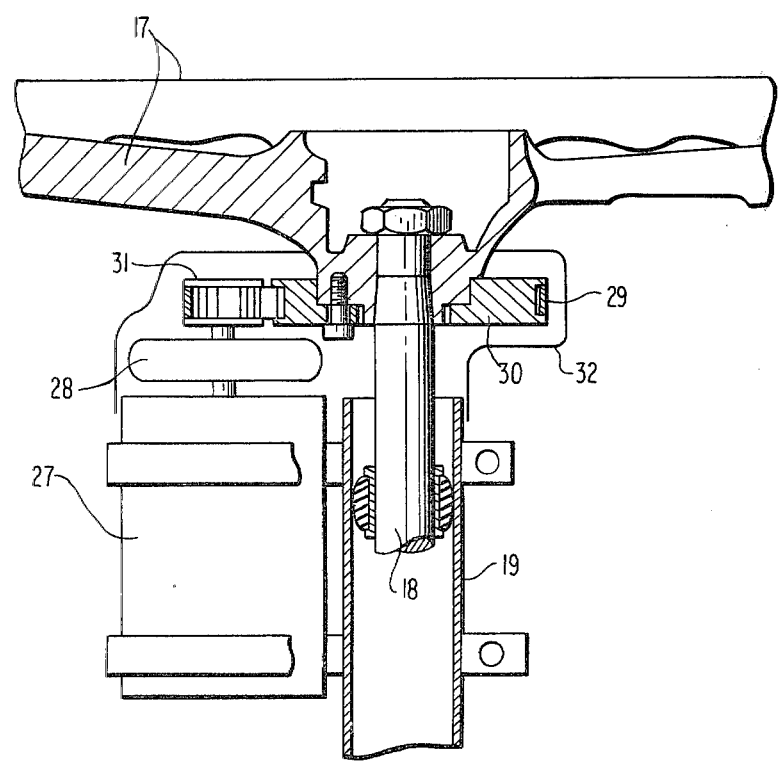
FIG. 3 is an axial cross-sectional view through a first embodiment of a drive mechanism for applying a pretensioning moment in accordance with the present invention.

To pivot the turnable or steerable wheels 10, as shown in FIG. 2, the wheels 10 are connected to each other as well as to a steering gear mechanism 16 by way of a steering linkage 15. The steering gear mechansim 16 can, in turn, be driven, preferably with the supply of auxiliary energy, from the steering wheel 17 by way of a steering shaft 18 (FIG. 3). The steering shaft 18 is surrounded by a stationary jacket or tubular pipe member 19 (FIG. 3) which rests, by way of a mounting bracket 20 (FIG. 4) on a fixed point of the body of the vehicle 1.

As shown in FIG. 3, for the purposes of introducing a torque into the steering shaft 18, a conventional electric motor 27 is mounted on the jacket or tubular pipe member 19 and secured thereat against rotation. The motor 27 is adapted to drive a pinion by way of a conventional hydrodynamic clutch 28 with the pinion 31 being provided with suitable gear teeth for meshing with a gear belt 29. A corresponding gear belt wheel 30 is arranged at the steering wheel 17 with the gear belt 29 being guided over the gear belt wheel 30. The entire drive mechanism which includes the hydrodynamic clutch 28 and the gear belt drive system of the gear belt 29, gear belt wheel 30, and pinion 31 is encapsulated or accommodated in a housing or hood 32 so that it can be safely handled.

If the motor 27 is actuated so as to drive in a given direction of rotation, an output torque of the motor 27 is transmitted by way of the hydrodynamic clutch 28, which is effective even at a slip rate of 100%, by way of the pinion or gear wheel 31 and the gear belt 29 to the larger gear belt wheel 30 and thus to the steering wheel 17. The direction of the torsional moment or torque is determined by the direction of rotation of the electric motor 27.

Apart from the gear transmission, the torque transmitted to the steering shaft corresponds in any event to the torque provided by the electric motor 27. This torque is determined by the characteristics of the motor 27. In general, the torque will be higher the higher the speed of the motor 27. Upon a rotation of the motor 27 toward the right, a moment is correspondingly exerted on the steering shaft 18 which rotates the latter toward the right and, accordingly, the steering linkage 15 will be biased in a direction toward the righthand side of the vehicle 1. The right transverse guide roller 12 correspondingly contacts the associated transverse guide bar 6 such that the guide bar 6 by itself takes over the transverse guidance of the vehicle 1.

An electrical or electronic control means 30 may be provided in the vehicle 1 for the steering and regulation of the pretensioning moment of the steering of the vehicle 1. Prior to entering a switch, an electric signal may be fed to the control means either by contacts provided on the side of the track or by the driver. The controller then would amplify the received signal into a setting command for controlling the operation of the drive motor 27. The torque of the drive motor 27 acts, by way of the steering shaft 18, on the steering gear mechanism 16 and is there once again amplified, hydraulically in case of a hydraulically supported servo steering mechanism, so that the vehicle steering system is turned in a predetermined direction. However, since the transverse guide roller 12 is already in contact with the corresponding transverse guide bar 4, the pretensioning moment acts, without an appreciable pivoting of the turnable or steerable wheels 10, essentially merely on the transverse guide edge. The vehicle is thus guided in the expanded or switch area of the track, along the outer continuous transverse guide bar 6 against which the guide roller 12 is biased.

With a guidance of the vehicle 1 in the aforementioned manner, a constant pretensioning moment is applied to the steering mechanism. This pretensioning moment is designed so that it is larger than the sum of all the forces oriented away from the transverse guide bar 6, which forces may be produced by, for example, unbalanced vehicle brakes or centrifugal forces, the transverse guide roller 12 must be urged even in case of an unfavorable occurrence of interfering forces, with a minimum contact force of, for example, 200 N against the corresponding transverse guide bar.

In addition to the aforementioned type of guiding operation with a constant pretensioning moment, a transverse guidance with constant roller contact force is also possible. For this purpose, the electronic controller of the switch setting device is to be constructed so that, in contrast to the abovedescribed setting, the contact force of the transverse roller 12 is constantly controlled.

For this purpose, as shown in FIG. 2, a conventional dynamometer 14 may be provided in the supporting arms 11 so that the contact force of the transverse guide rollers 12 is constantly measured. Upon a deviation from a given desired value of the contact force, the steering pretension produced by the pretensioning drive motor 27 is varied until the desired value for the contact of the transverse roller 12 has once again been attained.

An advantage of the last mentioned type of guidance resides in the fact that the contact force of the transverse guide rollers 12 remains almost the same even in the case of disturbances; therefore, the minimum value of contact force for the transverse guide rollers 12 can be set to be relatively low. However, in contradistinction thereto, an increased technical expenditure must be tolerated in the form of a closed control circuit with an appropriate pressure gauge.

As noted above, in traversing relatively sharp curves, a transverse guide bar is provided only at the outside of the curve and there is no transverse guide bar provided on the inside of the curve or such guide bar is at least normally ineffective at that point due to the inwardly oriented lateral displacement of the rear vehicle axle 9. The vehicle 1 must be guided along sharp curves unilaterally along the transverse guide bar on the outside of the curve. When guiding the vehicle along the transverse guide bar on the outside of the curve, the centrifugal force acts along the lines of an additional contact pressure for the transverse guide roller 12 but the vehicle 1 can be pulled away from the guide edge due to, for example, unbalanced brakes of the vehicle 1.

To insure a certain minimum contact force for the transverse guide rollers 12 in the guidance of the vehicle through a relatively sharp curve, the electronic controller of the switch setting means can be constructed so that, in addition to executing a switch setting function, when a certain turning angle of the steerable wheels 10 and/or of the steering wheel 17 has been exceeded, a certain steerage-centering torque is applied to the steering system by the drive motor 17.

Figure 4:
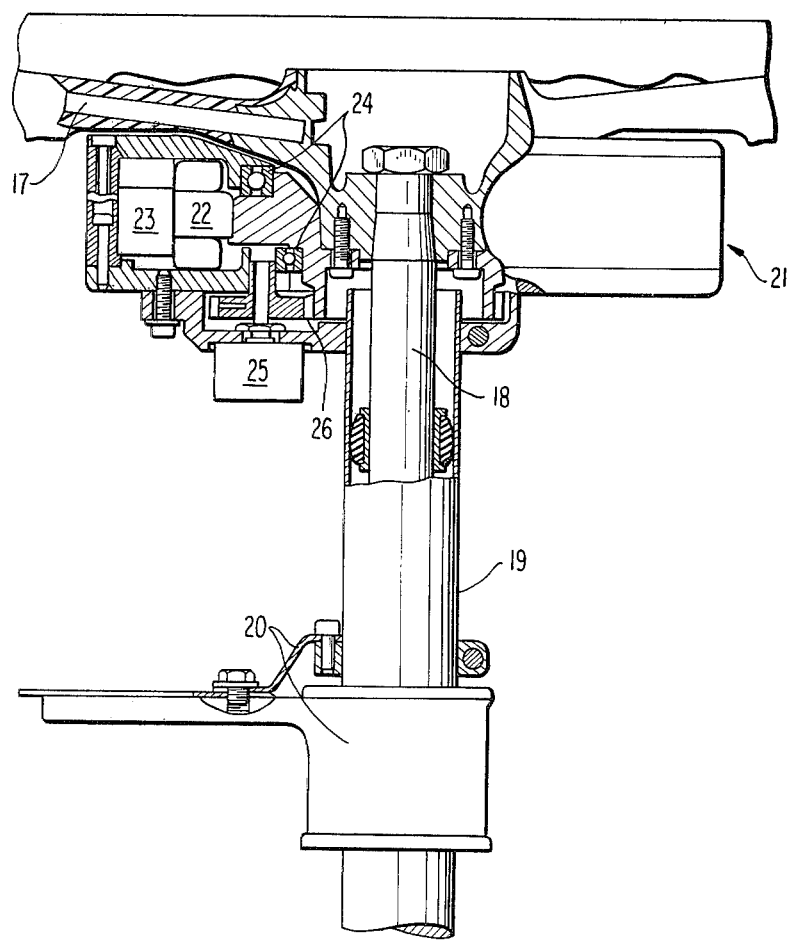
FIG. 4 is an axial cross-sectional view of a second embodiment of a drive mechanism for applying a pretensioning moment in accordance with the present invention.

To determine the existence of the predetermined turning angle, an appropriate rotary position indicator may be provided. For this purpose, as shown in FIG. 4, the rotary position indicator may be in the form of a rotary potentiometer 25 comparable by a gear meshing means 26. By virtue of the provision of a rotary position indicator, the above-noted centering function of the steering system can be actuated automatically when the vehicle 1 is traversing a curve of predetermined radii where the inside transverse guide bar is omitted or at least is normally ineffective.

FIG. 4 provides an illustration of a further construction for applying a torque to pretension or bias the steering system of the vehicle 1 for a unilateral transverse guidance of the vehicle 1. In this arrangement, a conventional torque motor generally designated by the reference numeral 21 is disposed in the zone of a hub of the steering wheel 17 so as to be concentric with respect to the steering wheel. A stator 23 of the torque motor 21, which is located radially on the outside of the motor 21, by a clamping action and operatively associated with the jacket 19. The rotor 22 of the torque motor 21, which is located radially inwardly of the torque motor 21, is threadably joined or otherwise suitably affixed to the hub of the steering wheel 17. The rotor 22 and the stator 23 are accurately guided with respect to each other by way of suitable bearings 24.

Torque motors 21 permit a definite transmission of torque even during stand still and even over longer periods of time without there being the danger of an undue overheating of the motor 21. The torque is determined by the amperage; whereas, the direction of torque can be affected by the polarity of the current supplied. The rotary potentiometer 25 is driven by way of a gear meshing means 26 by the stator 22 of the torque motor 21.

While we have shown and described only two embodiments in accordance with the present invention, it is understood that the same is not limited thereto but is susceptible of numerous changes and modifications as known to one having ordinary skill in the art and we therefore do not wish to be limited to the details shown and described herein.

We claim:

1. A vehicle adapted to be externally mechanically guided along guide tracks, the vehicle comprising a steerable vehicle axle means provided with steerable wheels arranged at respective sides of the vehicle, a steering linkage means for operatively connecting the steerable vehicle axle means with a steering wheel, support arm means rigidly mounted at wheel hubs of the steerable wheels and extending unilaterally forwardly in a driving direction of the vehicle, transverse guide roller means arranged at a forward end of each of the support arm means and forwardly of the respective steerable wheels for enabling an automatic guide track side influencing of a turning angle of the steerable wheels, characterized in that transverse guide roller means are arranged in a fixed correlation with a wheel plane of the respective steerable wheels, the steering wheel means includes a hub means, and in that drive motor means are provided for selectively exerting a torque which is freely selectable in its effective direction on the steering wheel of the vehicle.

2. A vehicle according to claim 1, characterized in that the drive motor is fixedly mounted in an area of the hub means, the drive motor includes an output member operatively connected to the steering wheel and capable of exerting a torque at a quasi-stand still operation.

3. A vehicle according to claim 2, characterized in that the support arm means are constructed so as to be maximally-bending resistant.

4. A vehicle according to claim 3, characterized in that means are provided for selectively biasing the support arm means in a direction toward one of the two vehicle sides.

5. A vehicle according to one of claims 1 to 2, characterized in that the drive motor means is constructed so as to enable a free selection of an amount of torque to be exerted on the steering wheel.

6. A vehicle according to claim 5, characterized in that the drive motor means is constructed as an electric torque motor.

7. A vehicle according to claim 6, characterized in that the electric torque motor is disposed concentrically with respect to the hub means of the steering wheel.

8. A vehicle according to claim 6, characterized in that means are provided for indicating a position of the steering wheel.

9. A vehicle according to claim 8, characterized in that said indicating means includes a rotary potentiometer operatively connected to at least one of the steering linkage means and the steering wheel so as to provide an indication of at least one of a pivotal position of the steering linkage means and rotary position of the steering wheel.

10. A vehicle according to claim 5, characterized in that the drive motor means is an electric motor arranged eccentrically to an axis of rotation of the steering wheel, and in that means are provided for drivingly connecting the electric motor with the hub means of the steering wheel.

11. A vehicle according to claim 10, characterized in that the connecting means includes a gear means and a slip clutch means interposed between an output of the electric motor and the gear means.

12. A vehicle according to claim 11, characterized in that the slip clutch means is constructed as a hydrodynamic clutch.

13. A vehicle according to claim 12, characterized in that the gear means includes a belt drive gear system comprising a pinion means driven by the electric motor through said hydrodynamic clutch, a gear wheel operatively connected with the steering wheel, and a gear belt arranged between the pinion means and the gear wheel.

14. A vehicle according to claim 13, characterized in that means are provided for indicating a position of the steering wheel.

15. A vehicle according to claim 14, characterized in that said indicating means includes a rotary potentiometer operatively connected to at least one of the steering linkage means and the steering wheel so as to provide an indication of at least one of a pivotal position of the steering linkage means and rotary position of the steering wheel.

16. A vehicle according to claim 1, characterized in that a slip clutch means is arranged between the drive motor means and the steering wheel for operatively connecting the drive motor means to the steering wheel.

17. A vehicle according to claim 1, characterized in that means are provided for indicating a predetermined positioning of the steering wheel.

18. A vehicle according to claim 17, characterized in that said positioning means includes a rotary potentiometer operatively connected to at least one of the steering linkage means and the steering wheel so as to provide an indication of at least one of a pivotal position of the steering linkage means and a rotary position of the steering wheel.

19. A vehicle according to claim 1, characterized in that control means are provided for steering and regulating of the torque exerted on the steering wheel of the vehicle.

20. A vehicle adapted to be externally mechanically guided along guide tracks, the vehicle comprising a steerable vehicle axle means provided with steerable wheels arranged at respective sides of the vehicle, a steering linkage means for operatively connecting the steerable vehicle axle means with a steering wheel, support arm means arranged at wheel hubs of the steerable wheels and extending unilaterally forwardly in a driving direction of the vehicle, transverse guide roller means arranged at a forward end of each of the support arm means and forwardly of the respective steerable wheels for enabling an automatic guide track side influencing of a turning angle of the steerable wheels, characterized in that the transverse guide roller means are arranged in a fixed correlation with a wheel plane of the respective steerable wheels, the steering wheel means includes a hub means, drive motor means are provided for selectively exerting a torque which is freely selectable in its effective direction on the steering wheel of the vehicle, the drive motor means is an electric motor constructed so as to enable a free selection of an amount of torque to be exerted on the steering wheel and is arranged eccentrically to an axis of rotation of the steering wheel, means are provided for drivingly connecting the electric motor with the hub means, the connecting means includes a gear means and a hydrodynamic slip clutch means interposed between an output of the electric motor and the gear means, the gear means includes a belt drive gear system comprising a pinion means driven by the electric motor through said hydrodynamic clutch, a gear wheel operatively connected with the steering wheel, and a gear belt arranged between the pinion means and the gear wheel, means are provided for indicating a position of the steering wheel, including a rotary potentiometer operatively connected to at least one of the steering linkage means and the steering wheel so as to provide an indication of a pivotal position of the steering linkage means and rotary position of the steering wheel, and in that means are provided for measuring a contact force of the transverse guide means at the guide track.

21. A vehicle according to claim 20, characterized in that said measuring means includes a dynamometer arranged at each of said supporting arm means.

22. A vehicle according to claim 20 or 21, characterized in that the drive motor means is fixedly mounted in an area of the hub means, the drive motor means includes an output member operatively connected to the steering wheel and capable of exerting a torque at a quasi-stand still operation.

23. A vehicle adapted to be externally mechanically guided along guide tracks, the vehicle comprising a steerable vehicle axle means provided with steerable wheels arranged at respective sides of the vehicle, a steering linkage means for operatively connecting the steerable vehicle axle means with a steering wheel, support arm means arranged at wheel hubs of the steerable wheels and extending unilaterally forwardly in a driving direction of the vehicle, transverse guide roller means arranged at a forward end of each of the support arm means and forwardly of the respective steerable wheels for enabling an automatic guide track side influencing of a turning angle of the steerable wheels, characterized in that transverse guide roller means are arranged in a fixed correlation with a wheel plane of the respective steerable wheels, the steering wheel means includes a hub means, and in that drive motor means are provided for selectively exerting a torque which is freely selectable in its effective direction on the steering wheel of the vehicle, and in that means are provided for measuring a contact force of the transverse guide means at the guide track.

24. A vehicle according to claim 23, characterized in that said measuring means includes a dynamometer arranged at each of said supporting arm means.

* * * * *